United States Patent
Kun-Chuan

[11] Patent Number: 5,816,337
[45] Date of Patent: Oct. 6, 1998

[54] HANDLE OF GARDENING TOOL

[76] Inventor: Hsu Kun-Chuan, 118, Lane 444, Section 7, Chan Luh Road, Chiao Tou Village, Foo Hsin Hsiang, Chan Hua Hsien, Taiwan

[21] Appl. No.: 921,075

[22] Filed: Aug. 29, 1997

[51] Int. Cl.$^6$ ..................................................... A01B 1/22
[52] U.S. Cl. ........................ 172/372; 172/381; 16/114 R
[58] Field of Search .................................. 172/371, 372, 172/364, 365, 366, 381; 16/110 R, 114 R, 114 A, 110 A; 403/4, 33, 164, 165, 260, 305, 408.1

[56] References Cited

U.S. PATENT DOCUMENTS

| | | | |
|---|---|---|---|
| 3,143,984 | 8/1964 | Morasch | 172/371 X |
| 4,444,294 | 4/1984 | Yoshigai | 403/408.1 X |
| 4,997,303 | 3/1991 | Xu et al. | 403/4 |
| 5,080,313 | 1/1992 | Byrum et al. | 403/260 X |
| 5,097,909 | 3/1992 | Jauhal et al. | 172/371 |
| 5,104,141 | 4/1992 | Grove et al. | 403/4 X |
| 5,286,130 | 2/1994 | Mueller | 403/165 X |
| 5,477,929 | 12/1995 | Kenyon et al. | 172/371 X |
| 5,549,167 | 8/1996 | Keperling, Sr. et al. | 172/372 X |
| 5,579,848 | 12/1996 | Hsu | 172/371 X |
| 5,628,370 | 5/1997 | Chrysler | 172/372 |
| 5,690,181 | 11/1997 | Shu | 172/371 X |
| 5,709,513 | 1/1998 | Tsai | 403/260 X |

*Primary Examiner*—Michael J. Carone
*Assistant Examiner*—Christopher J. Novosad
*Attorney, Agent, or Firm*—Harrison & Egbert

[57] ABSTRACT

A gardening tool is composed of a blade, a handle, and an eccentric rotating device connecting the blade and the handle. The blade has a connector provided with a receiving hole, whereas the handle is provided at one end thereof with a fastening hole. The eccentric rotating device is composed of a locating rod, a rotating rod and a bolt. The locating rod is securely received in the receiving hole of the connector of the blade while the rotating rod is fitted into the fastening hole of the handle. The locating rod and the rotating rod are held together end to end by the bolt such that the rotating rod can be actuated by the handle to turn.

3 Claims, 3 Drawing Sheets

HANDLE OF GARDENING TOOL

FIELD OF THE INVENTION

The present invention relates generally to a gardening tool, and more particularly to a handle of the gardening tool.

BACKGROUND OF THE INVENTION

The conventional gardening implements are commonly defective in design in that the handles are not securely fastened with the blade portions, and that the handles are not replaceable, and further that the handles do not afford the users a gripping comfort.

SUMMARY OF THE INVENTION

It is therefore the primary objective of the present invention to provide a gardening tool with an improved handle free from the shortcomings of the above-described handles of the prior art gardening tools.

In keeping with the principle of the present invention, the foregoing objective of the present invention is attained by a gardening tool comprising a blade, a handle, and an eccentric rotating device. The blade is provided with a connector having a receiving hole for accommodating the eccentric rotating device which is composed of a locating rod, a rotating rod, and a bolt. The connector of the blade is fitted into a fastening hole of the handle such that the locating rod is engaged with the receiving hole of the connector, and that the rotating rod is received in the fastening hole of the handle, and further that the bolt is engaged with an eccentric threaded hole of the rotating rod.

The foregoing objectives, features, functions, and advantages of the present invention will be more readily understood upon a thoughtful deliberation of the following detailed description of an embodiment of the present invention with reference to the accompanying drawings.

DETAILED DESCRIPTION OF THE EMBODIMENTS

As shown in FIGS. 1–4, a gardening tool embodied in the present invention is composed of a blade 11, a handle 14, and an eccentric rotating device 20.

Figure 1:
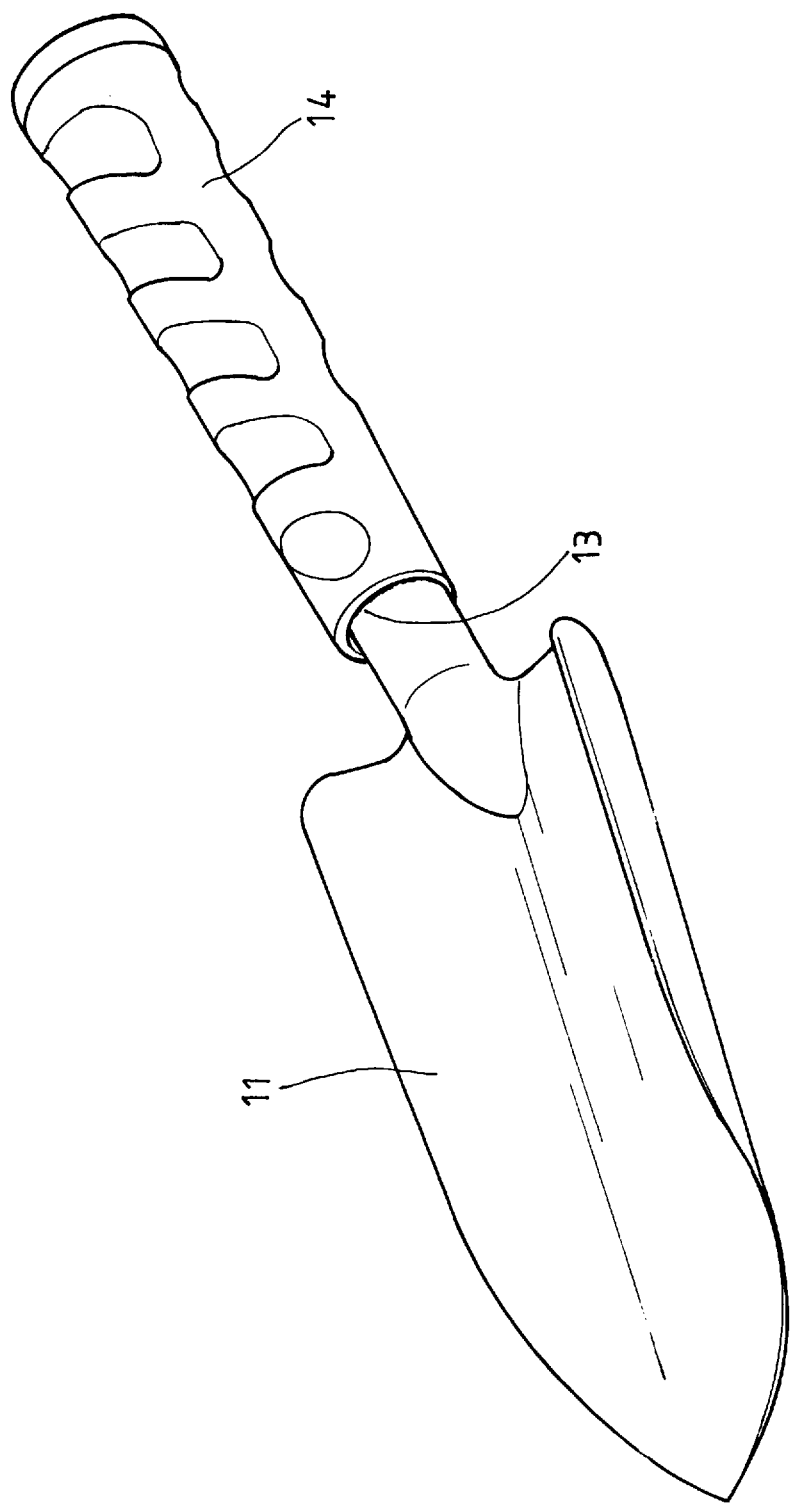
FIG. 1 shows a perspective view of a gardening tool of the embodiment of the present invention.
Figure 2:
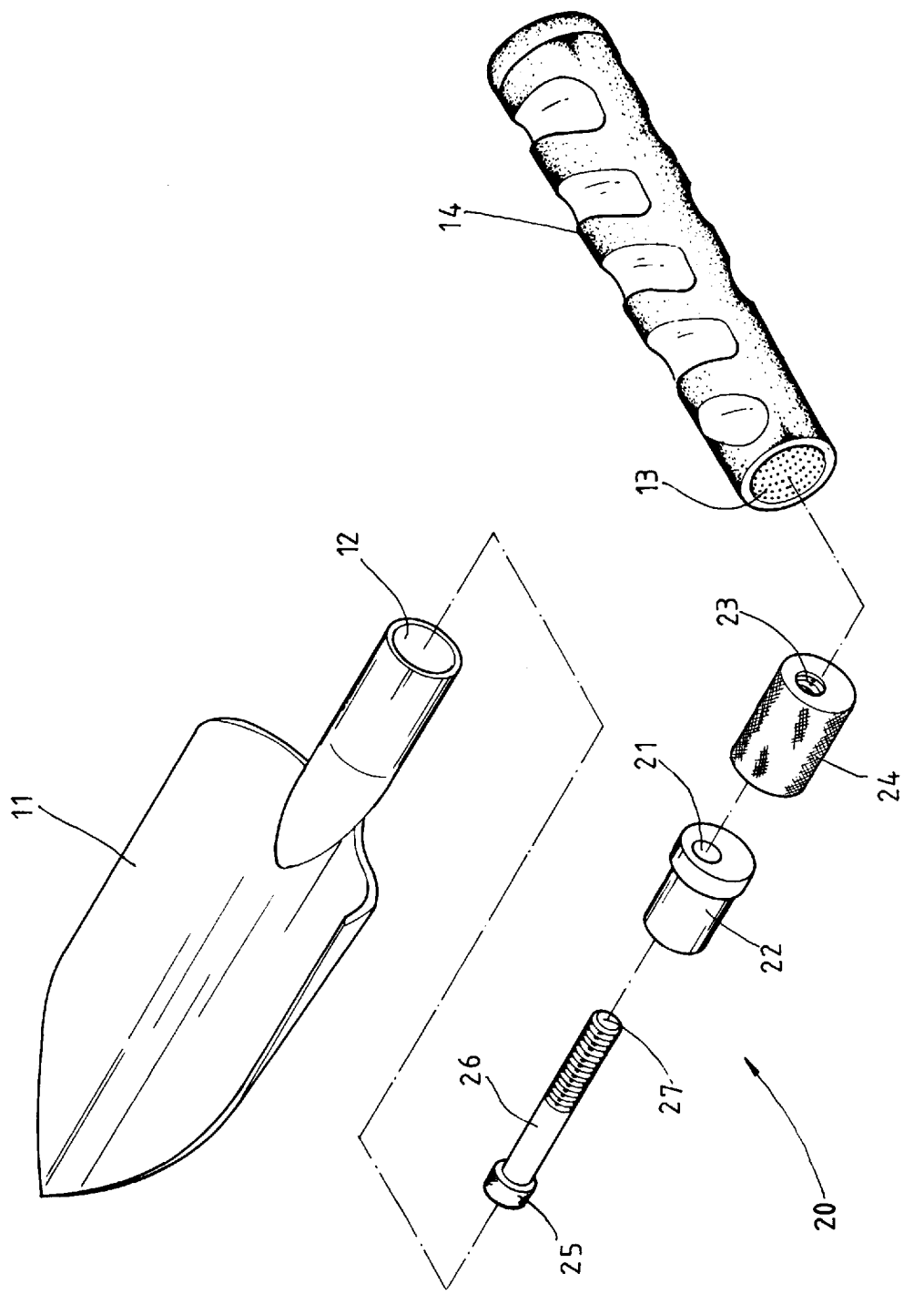
FIG. 2 shows an exploded view of the gardening tool of the embodiment of the present invention.
Figure 3:
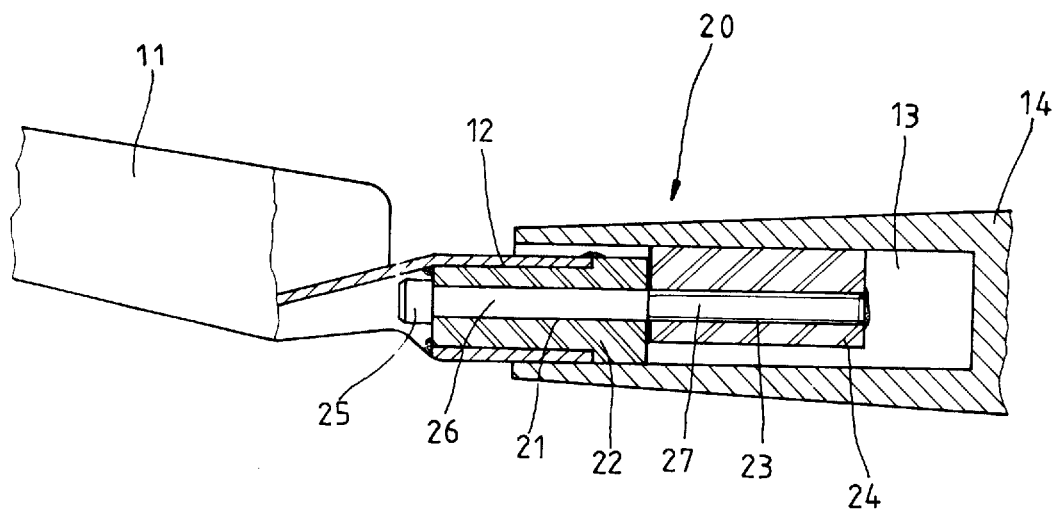
FIG. 3 shows a partial longitudinal sectional view of the present invention in combination.
Figure 4:
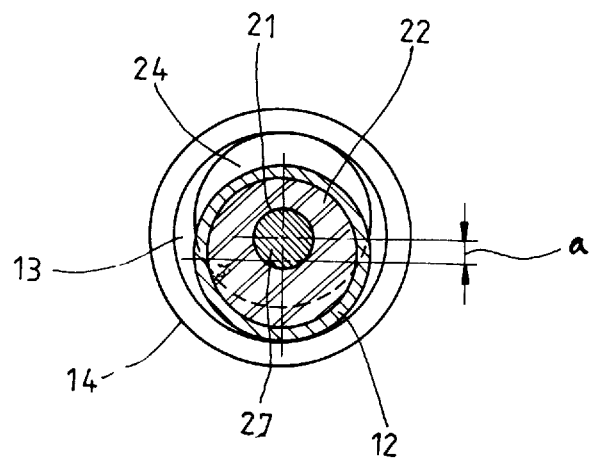
FIG. 4 shows a partial cross-sectional view of the present invention in combination.

The blade 11 is provided with a connector 11a having a receiving hole 12, whereas the handle 14 is provided with a fastening hole 13 facing the receiving hole 12 of the blade 11. The receiving hole 12 is intended to accommodate the eccentric rotating device 20, which includes of a locating rod 22, a rotating rod 24, and a bolt 27. The locating rod 22 has an axial hole 21 eccentrically located relative to a line passing longitudinally through a center of the locating rod 22 (as shown in FIGS. 2 and 4). The rotating rod 24 has an threaded hole 23 eccentrically located relative to a line passing longitudinally through a center of the rotating rod 24 (as shown in FIGS. 2 and 3). This threaded hole 23 extends through both ends of the longitudinal axis of the rotating rod 24. The receiving hole 12 of the connector of the blade 11 has a depth extending in the direction of the longitudinal axis of the connector. In combination, the locating rod 22 of the eccentric rotating device 20 is received in the receiving hole 12 of the connector of the blade 11 such that the bolt 27 is engaged with the threaded hole 23 of the rotating rod 24 via the axial hole 21 of the locating rod 22. The connector 11a of the blade 11 is fitted into the fastening hole 13 of the handle 14. It must be noted here that the fastening hole 13 of the handle 14 has an inner diameter which must be more than two times of the eccentric distance (a), as illustrated in FIG. 4. As shown in FIGS. 1 and 3, the bolt 27 has a head 25 at one end and a threaded shank 26 extending therefrom.

The rotating rod 24 of the eccentric rotating device 20 may be provided in the outer wall surface thereof with the embossed patterns 24a. Similarly, the fastening hole 13 of the handle 14 may be provided in the inner wall surface thereof with the embossed patterns 13a capable of enhancing the mechanical friction between the rotating rod 24 and the fastening hole 13. The handle 14 may be provided in the outer wall surface thereof with a plurality of decorative patterns for enhancing the decorating effect and the gripping effect of the handle 14.

In operation, the reverse rotation of the handle 14 is capable of actuating the rotating rod 24 of the eccentric rotating device 20, thereby resulting in the rotation of the bolt 27.

The embodiment of the present invention described above is to be deemed in all respects as being merely illustrative and not restrictive. Accordingly, the present invention may be embodied in other specific forms without deviating from the spirit thereof. The present invention is therefore to be limited only by the scope of the following appended claims.

What is claimed is:

1. A gardening tool comprising:

a blade having a connector located at one end thereof and provided with a receiving hole extending in a direction of a longitudinal axis of said connector;

a handle provided at one end thereof with a fastening hole having a depth and extending a direction of a longitudinal axis thereof; and an eccentric rotating device composed of a locating rod having an axial hole; a rotating rod having a threaded hole, and a bolt engaged with said threaded hole via said axial hole, said axial hole eccentrically located relative to a line passing longitudinally through a center of said locating rod, said threaded hole eccentrically located relative to a line passing longitudinally through a center of the rotating rod;

said eccentric rotating device being located between said connector of said blade and said one end of said handle such that said locating rod is received securely in said receiving hole of said connector, and that said rotating rod is fitted securely into said fastening hole of said handle, and further that said handle can be rotated to actuate said rotating rod to turn.

2. The gardening tool as defined in claim 1, wherein said rotating rod of said eccentric rotating device is provided in an outer wall surface thereof with a plurality of embossed patterns; and wherein said fastening hole of said handle is provided in an inner wall thereof with a plurality of embossed patterns capable of frictional contact with said embossed patterns of said rotating rod.

3. The gardening tool as defined in claim 1, wherein said handle is provided in an outer wall thereof with a plurality of decorative patterns.

* * * * *